US006398945B1

(12) United States Patent
Henriksen

(10) Patent No.: US 6,398,945 B1
(45) Date of Patent: Jun. 4, 2002

(54) METHOD OF TREATING CORROSION IN REINFORCED CONCRETE STRUCTURES BY PROVIDING A UNIFORM SURFACE POTENTIAL

(75) Inventor: Sten K. Henriksen, Weston, FL (US)

(73) Assignee: Infrastructure Repair Technologies, Inc., Woburn, MA (US)

( * ) Notice: Subject to any disclaimer, the term of this patent is extended or adjusted under 35 U.S.C. 154(b) by 0 days.

(21) Appl. No.: 09/620,848

(22) Filed: Jul. 21, 2000

Related U.S. Application Data
(60) Provisional application No. 60/145,059, filed on Jul. 22, 1999.

(51) Int. Cl.[7] ............................................... C23F 13/04
(52) U.S. Cl. ......................................................... 205/734
(58) Field of Search ............................................ 205/734

(56) References Cited

U.S. PATENT DOCUMENTS

| | | | |
|---|---|---|---|
| 3,145,502 A | 8/1964 | Rubenstein | 50/128 |
| 3,450,619 A | 6/1969 | Kruse et al. | 204/195 |
| 3,475,304 A | 10/1969 | Curry | 204/147 |
| 3,493,484 A | 2/1970 | Berg et al. | 204/195 |
| 3,499,783 A | 3/1970 | Nelson et al. | 117/72 |
| 3,705,089 A | 12/1972 | Grubb | 204/195 F |
| 4,091,148 A | 5/1978 | Blankenhorn et al. | 427/314 |
| 4,109,033 A | 8/1978 | Blankenhorn et al. | 427/314 |
| 4,199,625 A | 4/1980 | Pilny et al. | 427/385.5 |
| 4,255,241 A | 3/1981 | Kroon et al. | 204/147 |
| 4,342,796 A | 8/1982 | Brown et al. | 427/136 |
| 4,363,836 A | 12/1982 | Sakato et al. | 427/393.6 |
| 4,506,485 A | 3/1985 | Apostolos | 52/515 |
| 4,575,468 A | 3/1986 | Sakuta | 427/393.6 |
| 4,596,725 A | 6/1986 | Kluth et al. | 427/385.5 |
| 4,699,703 A | 10/1987 | Norman | 204/196 |
| 4,772,377 A | 9/1988 | Geist et al. | 204/415 |
| 4,812,212 A | 3/1989 | Dimond et al. | 204/147 |
| 4,832,803 A | 5/1989 | Vennesland | 204/130 |
| 4,855,027 A | 8/1989 | McCready | 204/196 |
| 4,865,702 A | 9/1989 | Miller et al. | 204/147 |
| 4,900,405 A | 2/1990 | Otogawa et al. | 204/1 T |
| 4,900,410 A | 2/1990 | Bennett et al. | 204/147 |
| 4,990,231 A | 2/1991 | Stewart | 204/147 |
| 5,015,351 A | 5/1991 | Miller | 204/182.2 |
| 5,049,412 A | 9/1991 | Miller | 427/140 |
| 5,141,607 A | 8/1992 | Swiat | 204/147 |
| 5,198,082 A | 3/1993 | Vennesland et al. | 204/130 |
| 5,228,858 A | 7/1993 | Fromm | 434/84 |
| 5,228,959 A | 7/1993 | Miller | 204/130 |
| 5,296,120 A | 3/1994 | Bennett et al. | 204/196 |
| 5,320,722 A | 6/1994 | Miller | 204/130 |
| 5,407,543 A | 4/1995 | Miller | 204/130 |
| 5,538,619 A | 7/1996 | Miller | 205/734 |
| 6,022,469 A * | 2/2000 | Page | 205/734 |

FOREIGN PATENT DOCUMENTS

| | | |
|---|---|---|
| CA | 2018869 | 6/1990 |
| CA | 1289910 | 10/1991 |
| CA | 2076436 | 8/1992 |
| CA | 1325789 | 1/1994 |
| DE | 2030124 | 6/1970 |
| DE | 507057 | 5/1971 |
| EP | 200428 A2 | 4/1986 |
| EP | 264421 B1 | 4/1987 |
| EP | 398117 A2 | 7/1990 |
| JP | 4146373 A | 10/1990 |
| JP | 5148061 A | 6/1993 |
| JP | 05178678 | 7/1993 |
| JP | 05214818 | 8/1993 |
| JP | 05294758 | 11/1993 |
| JP | 06073897 | 3/1994 |
| JP | 6088435 A | 3/1994 |
| JP | 06173472 | 6/1994 |
| JP | 6200636 A | 7/1994 |
| JP | 7089773 A | 7/1994 |
| JP | 06212814 | 8/1994 |
| JP | 07033556 | 2/1995 |
| JP | 07070774 | 3/1995 |
| JP | 07089773 | 4/1995 |
| JP | 07109186 | 4/1995 |
| JP | 07286444 | 10/1995 |
| JP | 309684 A | 11/1995 |
| JP | 07291766 | 11/1995 |
| JP | 07291767 | 11/1995 |
| JP | 7315957 A | 12/1995 |
| JP | 7315958 A | 12/1995 |

(List continued on next page.)

OTHER PUBLICATIONS

W.B. Long, "Repairs to Fire Damaged Structures"; Concrete May 1984.

(List continued on next page.)

*Primary Examiner*—Bruce F. Bell
(74) *Attorney, Agent, or Firm*—Michael, Best & Friedrich LLC

(57) ABSTRACT

The invention provides a method of inhibiting or preventing corrosion of reinforced steel in concrete by eliminating the differences in surface potentials that result in the total passivation of corrosion activity and create an environment in the steel that does not allow corrosion. The method, optionally includes measuring the active non-uniform surface potential in the steel and passing a DC voltage through the concrete and steel to stop corrosion providing a substantially uniform surface potential on the reinforced steel. The current is controlled and adjusted to send pre-determined amounts of electrical energy to individual areas targeted for treatment. A corrosion potential survey may be conducted to determine the energy requirements necessary for the corrosion condition or a reference electrode may be strategically placed on the concrete structure. The amount of energy passed is sufficient to polarize the reinforcing steel sufficiently to stop corrosion and establish substantially uniform surface potentials on all the reinforcing steel. The invention also includes changing conditions on the surface of steel from a condition of non-uniform surface potential to a condition of substantially uniform surface potential.

42 Claims, 1 Drawing Sheet

FOREIGN PATENT DOCUMENTS

| | | |
|---|---|---|
| JP | 7315959 A | 12/1995 |
| JP | 07315960 | 12/1995 |
| JP | 7330467 A | 12/1995 |
| JP | 08002982 | 1/1996 |
| JP | 8021816 A | 1/1996 |
| JP | 08026856 | 1/1996 |
| JP | 8034681 A | 2/1996 |
| JP | 08040783 | 2/1996 |
| JP | 8040784 A | 2/1996 |
| JP | 08073284 | 3/1996 |
| JP | 08081286 | 3/1996 |
| JP | 8091958 A | 4/1996 |
| JP | 08104581 | 4/1996 |
| JP | 8119767 A | 5/1996 |
| JP | 08119768 | 5/1996 |
| JP | 08319182 | 12/1996 |
| JP | 09061421 | 3/1997 |
| JP | 9067937 A | 3/1997 |
| JP | 9142959 A | 6/1997 |
| JP | 09329568 | 12/1997 |
| JP | 10114585 | 5/1998 |
| JP | 10212176 | 8/1998 |
| JP | 10218687 | 8/1998 |
| JP | 10245280 | 9/1998 |
| NO | 139504 | 3/1979 |
| NO | 144982 | 12/1981 |
| NO | 158819 | 11/1988 |
| NO | 160696 | 5/1989 |
| NO | 170295 | 9/1992 |
| NO | 171606 | 4/1993 |
| NO | 176047 | 1/1995 |
| WO | WO/8706521 | 4/1987 |
| WO | WO96/35828 | 5/1996 |

OTHER PUBLICATIONS

Manning, et al., "Decision Criteria for the Rehabilitation of Concrete Bridge Decks"; Transportation Research Record 762; pp. 1–9, No Month/Year Available.

Fromm, "Successful Application of Cathodic Protection to a Concrete Bridge Deck"; Transportation Research Record 762; p. 9, No Month/Year Available.

Manning, et al., "Electrochemical Removal of Chloride Ions from Reinforced Concrete: Initial Evaluation of the Pier S19 Field Trial"; Transportation Reasearch Record 1304; pp. 153–159, No Month/Year Available.

Manson, et al., "Long–Term Rehabilitation of Salt–Contaminated Bridge Decks"; National Cooperative Highway Research Program Report 257; Transportation Research Board, Apr. 1983.

Maupin, et al., "Extending the Life of Bridges"; ASTM Special Tech. Publication, No. 1100; 1990, No Month Available.

Anonymous, "Repair Techniques Displayed at Bridge Deck Demonstration"; Highway Heavy Construction, vol. 127, No. 9; Sep. 1984; pp. 34–35.

Robinson, "Successful Electroshock Therapy for Deteriorated Bridges"; Transportation Research News, No. 58; 1975; pp. 2–3, No Month Available.

Slater, et al., "Electrochemical Removal of Chlorides from Concrete Bridge Decks"; Materials Performance, vol. 15, No. 11; Nov. 1976; pp. 21–26.

Asaro, et al., "Electrochemical Chloride Removal and Protection of Concrete Bridge Components (Injection of Synergistic Corrosion Inhibitors)"; Strategic Highway Research Program SHRP–S/FR–90–002; Oct. 1990.

Eltech Research Corporation, Bennett, et al., "Chloride Removal Implementation Guide"; Strategic Highway Research Program SHRP–S–347; Aug. 1993.

Anonymous, "Cathodic Protection of Bridges Simplified by New Anode Mesh"; Highway Heavy Construction, vol. 129, No. 2; Feb. 1986; pp. 32–34.

Collins, et al., "Repair of Concrete in the Marine Environment: Cathodic Protection vs. Chloride Extraction"; Repair of Concrete in the Marine Environment, vol. CE33, No. 1; Feb. 1991.

The Engineering Index Annual, 1991, vol. 90; p. 1296, No Month Available.

The Engineering Index Annual, 1991, vol. 90; pp. 2823, 2826, 2829–2830, No Month Available.

The Engineering Index Annual, 1990, vol. 89; pp. 1329–1331, No Month Available.

The Engineering Index Annual, 1989, vol. 88; p. 2308, No Month Available.

The Engineering Index Annual, 1986, vol. 85; pp. 959, 2038, No Month Available.

The Engineering Index Annual, 1986, vol. 85; pp. 971, 2052, No Month Available.

The Engineering Index Annual, 1985, vol. 84; pp. 1963–1964, No Month Available.

The Engineering Index Annual, 1981, vol. 80; p. 802, No Month Available.

The Engineering Index Annual, 1979, vol. 78; pp. 818–819, No Month Available.

The Engineering Index Annual, 1978, vol. 77; pp. 1342–1343, No Month Available.

Fontana, et al., "Electrically Conductive Polymer–Concrete Overlays"; Transportation Research Record 1041; pp. 1–9, No Month Available.

Fromm, "Electrically Conductive Asphalt Mixes for the Cathodic Protection of Concrete Bridge Decks"; Proc., Association of Asphalt Paving Technologists, vol. 45, 1976; pp. 385–399, No Month Available.

Herald, et al., "Condition Evaluation of Concrete Bridges Relative to Reinforcement Corrosion"; vol. 6: Method for Field Determination of Total Chloride Content; strategic Highway Research Program SHRP–S–328; Sep. 1992.

Morrison, et al., "Chloride Removal and Monomer Impregnation of Bridge Deck Concrete by Electro–Osmosis"; Kansas Dept. of Transportation Report No. FHWA–ks–RD. 74–1; Apr. 1976.

Clear, "Cathodic Protection of Concrete Bridge Members Containing Mild Reinforcing Steel"; Building Deck Waterproofing, ASTM STP 1084; Feb. 1990.

Orchard, "Corrosion Fighters Save Bride Decks From Road Salt Ravages"; Engineering and Contract Record, vol. 90, No. 3; Mar. 1997; pp. 20–21.

"Strategic Highway Research Program, Unpublished Research Results"; Oct. 1994; p. 3.

Chemical Abstracts 1996 125: p. 335 (Jan. 8, 1996).

Chemical Abstracts 1993 119: p. 232489 (Nov. 29, 1993).

* cited by examiner

METHOD OF TREATING CORROSION IN REINFORCED CONCRETE STRUCTURES BY PROVIDING A UNIFORM SURFACE POTENTIAL

PRIORITY CLAIM UNDER 35 U.S.C. SECTION 119(e)

This application claims priority to U.S. Provisional Patent Application serial No. 60/145,059 filed on Jul. 22, 1999 entitled "Method of Treating Corrosion in Reinforced Concrete Structures by Providing Uniform Surface Potential" by Sten Henriksen.

BACKGROUND OF THE INVENTION

1. Field of the Invention

The invention relates to a method of treating and/or preventing corrosion of steel, or other metal, in reinforced concrete structures. More particularly, the invention relates to a method of changing conditions on the surface of the steel from a condition of non-uniform surface potential where there is corrosion to a condition of substantially uniform surface potential where the corrosion is inhibited or prevented from forming. Specifically, the invention relates to a method of eliminating differences in surface potentials through applying continuously monitored, and uniquely adjusted, low voltage DC current to the steel reinforcement through an anode system which may, optionally, be temporarily installed on the surface of the concrete.

2. Summary of Related Art

A primary cause of the deterioration of reinforced concrete structures, such as bridge surfaces and substructures, is the corrosion of reinforcing steel due to exposure to chloride ions from salts used to de-ice the surface of the concrete or sea water. Chloride causes active corrosion by destroying the natural passivity of steel in the alkaline environment of concrete. Concrete is a porous material. Steel placed in fresh concrete will not corrode because the naturally high pH level of the concrete causes a passivating oxide film to form on the surface of the steel, preventing it from corrosion. Minor imperfections from the concrete placement operation, as well as varying conditions during the hydration process, will result in variations in pore distribution in the concrete, as well as introduce voids. Voids and non-uniform pore distribution will result in variations in the permeability of concrete.

The variations in permeability, and with normal aging through exposure to the forces of nature, as indicated above, gradually change the environment within the concrete, from an environment where corrosion cannot take place to one where it can. Since concrete is not totally homogenous, and the concrete cover is not uniform, some areas will be affected before other areas of concrete. In these affected areas, the combination of the environmental exposure, ingress of chlorides and carbonation will cause a shift in the surface potential of the steel and the steel will experience a gradual loss of passivation that is protecting it against the onset of corrosion. Corrosion will now commence.

Since corrosion is an electrochemical process, the differences in the surface potential cause a low level electric current to pass between areas of different potentials, including surrounding concrete which acts as an electrolyte. Anodic and cathodic areas are established. In the anodic areas, ferrous ions leave the steel surface and react with available oxygen or hydroxides, forming corrosion products as ferrous oxides and/or hydroxides. Volume increases, resulting in the concrete cracking and spalling.

The prior art addresses the foregoing issues by using two systems: cathodic protection and chloride removal. Cathodic protection is designed to stop corrosion through passing a current equal to, or slightly stronger than the corrosion current, in the opposite direction. The chloride removal systems are directed to maintain a potential difference between externally mounted anode and the reinforcing steel for the purpose of removing chloride ions through ion migration. The amount of electrical energy passed is designed to allow for a defined amount of chloride to be removed, and set levels defined as having no negative side effects.

U.S. Pat. No. 5,141,607 discloses a method and apparatus for treating reinforced steel for removing chlorides by placing an electrode adjacent an outer surface of the reinforced concrete structure, wetting the electrode and surface with an aqueous electrolyte and applying direct current between the reinforced steel and electrode to cause migration of the chloride ions.

U.S. Pat. No. 5,228,959 discloses a process for rehabilitating internally reinforced concrete by electrolytic ion migration by applying a removable adherent electrolyte to a surface area on the concrete and intermittently impressing and discontinuing a DC voltage between the internal reinforcement and electrode structure while measuring the potential difference of the internal reinforcement against a reference electrode structure.

U.S. Pat. No. 5,015,351 discloses a de-watering procedure for removing water from saturated, porous building materials, such as concrete wherein a controlled, cyclical voltage is applied to an electrode system for osmotic migration of water from an anode located inside the structure or in contact with it to a cathode.

U.S. Pat. No. 5,049,412 discloses a method of re-alkalizing concrete in which carbonation has occurred by applying a water tight adherent coating to the surface of the concrete and saturating the coating with water to affect diffusion of alkaline materials from the areas of less carbonation to areas of more carbonation in the concrete. The concrete can then become re-alkalized.

The prior art does not address a method to stop corrosion by eliminating the differences in corrosion potentials, as is defined in the present invention. This method is most efficient in addressing the corrosion of reinforced steel in concrete.

It is an object of the present invention to solve the problems of the prior art enumerated above and below.

SUMMARY OF THE INVENTION

The invention provides a method of inhibiting or preventing corrosion of reinforced steel in concrete by eliminating the differences in surface potentials that result in the total passivation of corrosion activity and create an environment in the steel that does not allow corrosion. This is basically accomplished by measuring the active non-uniform surface potential in the steel and passing a DC voltage through the concrete and steel to stop corrosion providing a substantially uniform surface potential on the reinforced steel. The current is controlled and adjusted to send pre-determined amounts of electrical energy to individual areas targeted for treatment. A corrosion potential survey may be conducted to determine the energy requirements necessary for the corrosion condition or a reference electrode may be strategically placed on the concrete structure. The amount of energy passed is sufficient to polarize the reinforcing steel sufficiently to stop corrosion and establish substantially uniform surface potentials on all the reinforcing steel.

It is an object of the present invention to change conditions on the surface of steel from a condition of non-uniform surface potential to a condition of substantially uniform surface potential.

Another object of the present invention is to stop corrosion of concrete reinforced steel by eliminating the differences in corrosion potentials.

It is another object of the present invention to provide total passivation of all corrosion activity in concrete reinforced steel and to create an environment around steel that does not allow for corrosion.

It is yet another object of the invention to stop corrosion by eliminating the differences in corrosion potentials. A current passed is controlled, and adjusted by a control unit, programmed to send predetermined amounts of electrical energy to individual areas targeted for treatment. The energy requirements are defined on the basis of the corrosion condition recorded in a corrosion potential survey, or by reference electrodes strategically placed in or by a structure. The control unit optionally works interactively with the reference electrodes, or is pre-programmed based on the measured corrosion potentials from the potential survey. The amount of current to be passed is determined for the purpose of polarizing the reinforcing steel sufficiently to stop corrosion and establishing substantially uniform surface potentials on all reinforcing steel.

Specific preferred embodiments of the present invention will become evident from the following detailed description of certain preferred embodiments.

DESCRIPTION OF A PREFERRED EMBODIMENT

Figure 1:
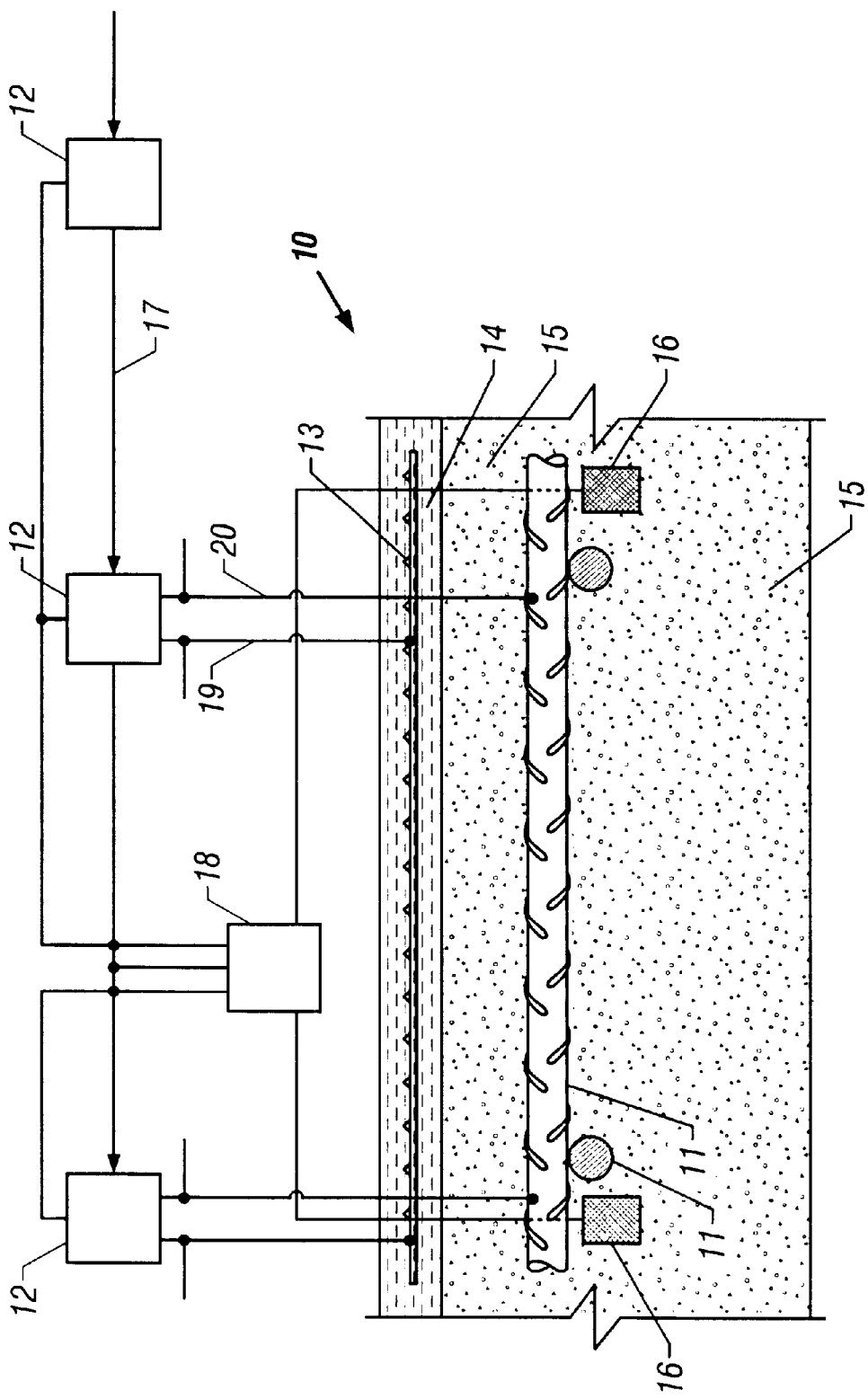
FIG. 1 illustrates a fragmentary cross section of a concrete structure with a steel reinforcement, electrolyte, anode and other elements.

The present invention relates to a method to inhibit and/or prevent corrosion by eliminating the differences in corrosion potentials.

The prior art generally relates to the reversal of the corrosion process by passing a low voltage current in the opposite direction of the corrosion current for the purpose of stopping the corrosion, typically called cathodic protection systems, as described above. The present invention is an improvement over these systems. A cathodic protection system is a permanent installation in a concrete structure. The present invention requires only a temporary application of the method and system described herein. The function of a cathodic protection system is to continuously push a current, approximately equal to the corrosion current, in the opposite direction to arrest the corrosion current.

The present invention passes a measured amount of energy in the form of DC current in the opposite direction of the corrosion current for the purpose of polarizing the steel to a level where corrosion cannot take place. This polarization shifts the surface potential of the steel being treated so that the resultant potentials are substantially uniform to an extent that cannot support any corrosion activity.

Referring now to the drawing, the reference numeral 10 designates in a general way a body of a steel reinforced concrete structure, which may be in the form of a vertical wall or overhead structure. The concrete wall typically includes a series of embedded steel reinforcing bars 11 of conventional type. In one aspect of the invention, the electrochemical passivation will only be effective on steel that is electrically continuous within the concrete structures to be treated. Continuity checks must be made prior to using the method of the present invention. Steel that is discontinuous must be made continuous.

Pursuant to the teachings of the present invention, a concrete structure 10 that has suffered corrosion can be rehabilitated or be treated for corrosion by the preferred method. Energy for the method is supplied through a distributed rectifier system, with individual rectifiers 12. Conventional rectifiers of various manufacturers may be used in the method. The rectifiers must be designed to operate in an outdoor, exposed condition, and deliver DC power with variable voltage and current. The arrangement of the rectifiers may vary depending on the requirements of each project.

The anode 13 may be any conductive material. It must be positively charged and be subject to consumption. It should be easy to install and remove since it does not become a permanent fixture on the structure to be treated. It should be able to conduct the desired current and have no permanent effect on the structure to be treated, for example, staining of the concrete, which cannot be removed.

Anode 13 must cover the entire area of the concrete to be treated and must be installed on the surface of the concrete with no direct contact with the steel in the structure to be treated. The anode can be placed on horizontal surface as long as there is no contact with the steel being treated. On vertical surfaces, it can be fastened to ensure stability during the treatment period. While any conductive material may be utilized as an anode, preferred anode materials are platinized titanium and steel. Preferably, the form of the anode is a mesh so that it can sufficiently cover large areas of the surface to be treated.

The electrolyte 14 must fully surround or embed anode 13 and have an adequate level of conductivity. During the treatment period of the present invention, the inventive method may cause a change in the pH level of the electrolyte due to the actions of the anode. Appropriate pH modifying materials may be added to the electrolyte to adjust the pH level to a proper balance. Additional chemical agents or materials may be added to the electrolyte 14 for purposes relating to the condition of the concrete for other purposes. Preferably, the electrolyte used of the electrochemical passivation is potable water. The electrolyte 14 is contained on the anode 13 by any conventional means. A liquid pond may be used. The electrolyte may be contained in tanks on the surface or it may be contained within a fibrous material held in place on the surface. Paper mache-like cellulosic pulp material formed of a mixture of cellulosic pulp in water or other solution, such as calcium hydroxide solution may also be used.

The concrete 15 will become saturated with the electrolyte 14, especially in the location between the steel reinforcement 11 and anode 13, which is the concrete cover to the reinforcement steel 11, and will form part of the electrolyte containment system. Any defects in the concrete 15 must be repaired prior to the use of the present invention. The repair of the concrete must not substantially change the electrical resistance in the concrete when compared with the original concrete. Direct contact between the anode 13 on the surface and the reinforcing steel 11 cannot take place so cracks in the concrete must be repaired. If necessary, steps must be taken to maintain a condition of relative uniform electrical resistance between anode 13 and the steel 11, for example, when the thickness of the sections of concrete in a structure vary, additional concrete may be added where necessary to insure electrical resistance.

Reference electrodes 16 are used to define the areas of corrosion activities in the reinforced concrete. The use of the reference electrodes is not required for one aspect of the invention, electrochemical passivation. However, use of the reference electrodes for monitoring installation and the effect of treatment is preferred. The type of electrode is immaterial and any conventional electrode can be utilized. The number and location of the reference electrodes will vary depending on the type of concrete structure. Reference electrodes may be added or deleted depending on the size of the structure.

A source 17 of electric current is supplied to rectifiers 12 and control unit 18. The rectifiers pass the voltage through a positive lead 19 to anode 13. Negative lead 20 is attached to reinforced steel 11. The distributed rectifier system enables each individual rectifier to supply an adjusted amount of energy to a designated area. The proper amount of energy is determined by the control unit based on information obtained from reference electrodes 16, which are installed at various strategic locations around the structure or from the corrosion potential survey. The control unit may work interactively with the reference electrodes or be pre-programmed based on the measured corrosion potentials from a potential survey made prior to treatment.

The control unit 18 monitors and/or controls the operation of the components used in the method of the present invention. The control unit can be installed on a temporary or permanent basis. Further, the control unit can be monitored remotely through a computer modem. The control unit 18 is a computer that can be programmed to measure polarization by defining the number of ampere hours charged to different sections of the concrete structure.

Pursuant to the invention, corrosion of reinforced steel in concrete can be inhibited or prevented by eliminating differences in surface potentials that result in total passivation of corrosion activity. Energy is passed through the steel and concrete in relatively accurate amounts to polarize the reinforcing steel sufficiently to stop corrosion and establish substantially uniform surface potentials on the reinforcing steel.

The cathodic protection system as a permanent installation wherein the method of the present invention is a temporary application. The function of a cathodic protection system is to continuously push a current, approximately equal to the corrosion current, in the opposite direction, and thereby arresting the corrosion current. The principle of the present invention is to pass a carefully measured amount of energy in the form of DC current in the opposite direction of the corrosion current for the purpose of polarizing the steel to a defined level and thereby to cause a shift in the surface potential of the steel. The resultant potentials are uniform to an extent that cannot support any corrosion activity.

The energy is supplied through a distributed rectifier system and uniquely adjusted by a control unit, receiving information through a system of strategically placed reference electrodes, so as polarize each area of steel sufficiently to result in an adjusted and relatively uniform surface potential on all the steel. In areas where there is condition of uniform potential, no corrosion can take place. The areas are selected from a potential survey, based on corrosion potentials or from the potentials registered with reference electrodes. The areas are selected, and the control unit programmed to supply sufficient energy to each area to energize the steel to a level that stops all corrosion activities, about 20 $Ah/ft^2$, and results in a condition of relative uniform surface potentials on all electrically connected steels. To obtain a lasting effect of uniform potentials and a corrosion passive state requires the passing of a minimum of about 50 $Ah/ft^2$.

Structurally, the method of the present invention generally requires the temporary installation of an anode, which is placed in an electrolyte contained in the surface of the concrete, a system of reference electrodes, strategically placed in a structure, a control unit, and a DC current supplied to the system through a AC/DC rectifier. The current passed will be in the range of about 0.05 through about 0.3 $A/ft^2$, which is significantly higher than the current use in a cathodic protection system. In addition, a secondary benefit to shifting the surface potential is that the cathode reaction taking place on the steel will produce hydroxyl, resulting in an increase in the pH level of the concrete, particularly around the steel. Further, all free ions between the temporary anode on the surface of the concrete and the embedded steel, migrate in accordance to their natural potential. Negatively charged ions, for example, chloride ions, migrate away from the steel and positively charged ions migrate towards the steel. This results in total passivation of all corrosion activity and therefore creates an environment around the steel that does not allow corrosion. This condition is achieved through establishing uniform surface potentials, an increase in the pH level on and around the steel and a total removal of all free chloride ions from the surface of the steel.

As described herein, the low voltage DC current is supplied to the installation through a distributed rectifier system, where each individual rectifier supplies an adjusted amount of energy to a designated area. The correct effective amount of energy is determined by a control unit, based on data obtained from reference electrodes installed in strategic locations around the structure, and/or from corrosion potential survey completed prior to installation of the system.

It is appreciated that the method described herein is different from other electrochemical methods in the manner through which the amount of current passed is monitored, ensuring that no area is over-treated, nor any area left untreated. The method is an improvement because it targets the corrosion activity, optimizes treatment times and the amount of energy required, resulting in the best possible protection against the re-initiation of corrosion. All reinforcing steel receives a controlled amount of energy, to ensure total passivation, as well as a uniform surface potential on all the treated reinforcing steel throughout the structure.

Yet a further improvement of the method described herein involves the use of a conductive gel having a bonding agent therein. One such commercially available conductive gel can be purchased from 3M and is available under the tradename "Hydrogel™". Hyrdrogel™ is comprised of an ionically conductive acrylic material. It is appreciated that other commercially available conductive gels can be used provided that they are modified to include a bonding agent.

A further improvement of the method lies in the electrolyte containment method, where a system is developed using a modified Hydrogel™, from 3M, in a sandwich with the anode material. The sandwich is constructed as follows: -Hydrogel™-carrier cloth-Hydrogel™-anode-Hydrogel™-carrier cloth. Variations exists where the carrier cloth is impregnated with Hydrogel™ prior to installation, and the anode/containment method is installed in individual layers. In any event, the individual layers may be assembled prior to installation, or be installed one after the other.

The modified Hydrogel™ may have different chemicals added to it for the purpose of enhancing special desirable effects. By way of example, one type of modified Hydrogel™ includes a pH booster to control the pH level of the electrolyte, or for the purpose of Re-alkalisation of carbonated concrete. Lithium salts may be added to control alkali-silica reaction in reactive aggregates, and other known commercially available chemicals may be used for different purposes depending on the desired effect.

Method of Operation

In order to accurately describe the method of the present invention, the following describes the sequence of steps of operation.

Condition Survey
- a: Initially a conventional survey is performed to determine the condition of the structure. Deficiencies in the structure are noted.
- b: To define the actual corrosion status of the structure, a conventional corrosion potential survey is carried out. This survey is also used to define the acceptance criteria for the treatment program. Electrodes are placed at strategic locations wherein an effective current is passed to determine differences in potentials.
- c: A continuity check, to determine if the steel reinforcement is electrically continuous within each section of the structures, as well as between individual sections is performed. Current is passed through the reinforcement to determine if there are breaks in the steel.
- d: Chloride profiles are obtained to determine chloride content at various levels in the sections to be treated. These values will also be used to define acceptance criteria for the treatment program. This is performed in a conventional manner.
- e: Suitability Review: (the construction of information and repair history, for example, are so structured).

Preparation of Specifications
- a: On the basis of the condition survey, detailed treatment specifications are prepared. For example, once the potentials and chloride profiles are noted, a higher current may be administered in the treatment for an appropriate amount of time to create a uniform surface potential.

Pre Treatment
- a: Bridge discontinuities in the steel reinforcement are converted if detected during the continuity checks.
- b: The concrete surface is prepared by cleaning, removal of old coatings, and adding cementitious material to increase resistance where necessary.
- c: If necessary, reference electrodes are installed if required in the treatment specification.

Installation
- a: Convert electrodes to the steel reinforcement, two connections to each reinforcement cage, or at least one connection for each 500 sq. ft. of concrete surface.
- b: Install anode mesh on concrete surface to be treated, using non conductive fasteners to the anode mesh.
- c: Install electrolyte containment over the anode.
- d: Install the electrolyte specified for the treatment.
- e: Make all electrical connections between the anode, the steel reinforcing and the rectifier system, including the control unit where used.
- f: Optionally, make electrical connections to the steel reinforcement, two connections to each reinforcement cage, or at least one connection for each 500 sq. ft. of concrete surface.
- g: Install anode mesh on concrete surface to be treated, using non conductive fasteners to the anode mesh.
- h: Install electrolyte containment over the anode.
- i: Install the electrolyte specified.

Operation
- a: Energize the system by applying DC current from each individual rectifier at a current density of 0.05–0.3 $A/ft^2$, as specified for each individual area, and defined by the results from the corrosion potential survey.
- b: Operate the system for the designated time for each individual area, so that each area get a charge of min. 20 $Ah/ft^2$, for non corroding areas, as defined by the corrosion potential survey, and with an increasing charge for the more actively corroding areas. Each project to be individually treated to account for local conditions.
- c: During the operation of the treatment program, all parameters defined in the specification shall be monitored, and intermediate conventional chloride tests performed as called for in the project specification.
- d: Remove the anode and all equipment, and prepare the treated surface as required by the specification. Where a steel mesh has been used as the anode, a light sandblasting to remove rust-staining may be required.

Documentation
- a: At the completion of the treatment program, new chloride tests are to be performed to document the results.
- b: At a defined period after the completion, 2–6 months typically, a new corrosion potential survey shall be carried out, as part of the documentation and proof that the acceptance criteria have been satisfied.
- c: Long term monitoring, including regular survey of the corrosion potentials at various locations on the steel reinforcement is recommended.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A method of arresting corrosion in steel reinforced concrete, comprising removably applying a system to said steel reinforced concrete that eliminates the surface potential differences in said steel.

2. The method of claim 1 further comprising controlling and adjusting current to send pre-determined amounts of electrical energy to individual areas of said steel targeted for treatment.

3. The method of claim 2 further comprising conducting a corrosion potential survey to determine the energy requirements necessary for the corrosion condition.

4. The method of claim 2 further comprising providing a reference electrode that is strategically placed on the concrete structure.

5. The method of claim 2 in which the amount of energy passed is sufficient to polarize the reinforcing steel sufficiently to stop corrosion and establish substantially uniform surface potentials on all the reinforcing steel.

6. A temporarily applied method of rehabilitating corroded metal reinforced concrete structures comprising changing conditions on the surface of said metal from a condition of non-uniform surface potential to a condition of substantially uniform surface potential.

7. The method of claim 6 in which said metal is steel.

8. A method of arresting corrosion of a conductive metal embedded in hardened concrete, comprising varying a condition on a surface of said metal from a condition of a non-uniform surface potential, said non-uniform surface potential including active corrosion, to a condition of a substantially uniform surface potential in which corrosion is substantially arrested.

9. The method of claim 8 in which said corrosion is completely arrested.

10. The method of claim 8 in which said metal is steel.

11. The method according to claim 8 in which said concrete around said embedded metal is not entirely homogenous as a consequence of imperfections from a concrete placement operation.

12. The method according to claim 8 in which said embedded metal develops areas of relative differences in surface potentials.

13. The method according to claim 12 in which said relative differences provide at least one anodic area and a cathodic area on said embedded metal resulting in a difference in surface potential.

14. The method according to claim 12 wherein said relative differences in surface potential cause the onset of corrosion.

15. The method according to claim 8 further comprising temporarily installing a conductive anode mesh on a surface of said hardened concrete.

16. The method according to claim 15 in which said step of temporarily installing includes embedding a conductive anode mesh in an electrolyte contained on said surface of said concrete.

17. The method according to claim 15 in which said step of temporarily installing includes providing a conductive anode mesh and an electrolyte.

18. The method according to claim 8 further comprising electrically connecting said conductive anode mesh to said embedded steel.

19. The method according to claim 18 in which said step of electrically connecting further comprising connecting said conductive anode mesh to said embedded steel using a system of distributed AC/DC rectifiers.

20. The method of claim 19 further comprising the step of passing an adjustable DC current from said rectifiers to said anode mesh and said embedded metal.

21. The method according to claim 18 further comprising adjusting a DC current passed as a function of a difference in a surface potential.

22. The method according to claim 21 in which said difference is obtained from a potential survey.

23. The method according to claim 21 in which said difference is obtained from at least two reference electrodes.

24. The method according to claim 23 in which said reference electrodes are strategically placed.

25. The method according to claim 21 further comprising polarizing said embedded steel to a predetermined level.

26. The method according to claim 25 in which said step of polarizing is a function of a surface potential difference.

27. The method according to claim 8, in which, in an area between said conductive anode mesh on said surface of said concrete and said embedded metal, free ions migrate in the direction dictated by their natural potentials.

28. The method according to claim 8, comprising negatively charging said embedded metal as a cathode.

29. The method of claim 28 further comprising facilitating a cathode reaction producing hydroxyl.

30. The method of claim 29 further comprising causing an increase in a pH-level around the embedded metal.

31. The method according to claim 8 in which negatively charged ions, optionally including chloride ions, migrate away from said metal, and positively charged ions migrate towards said metal.

32. The method according to claim 8 further comprising adjusting polarization, providing for a cathode reaction, and providing for ion migration, whereby the cummulative effect of practice of said method results in a condition of substantially uniform surface potentials on the metal creating an environment where corrosion cannot take place.

33. The method according to claim 8, further comprising providing a current density of about 0.01 to about 0.3 $A/ft^2$, whereby an actively corroding steel reinforced concrete structure, will stop corroding after the passing of a minimum of 20 $Ah/ft^2$, and remain passive in the corrosion sense after the passing of a min 50 $Ah/ft^2$.

34. A method of chloride removal form reinforced concrete comprising: preparing a detailed treatment specification comprising a first parameter; removing said chloride from said concrete by an electrochemical system comprising an electrolyte having a conductivity; monitoring said first parameter during operation of said electrochemical system; and adjusting the conductivity of said electrolyte in response to changes to said first parameter.

35. The method of claim 34 in which said step of adjusting the conductivity comprises adjusting a pH of said electrolyte.

36. The method of claim 35 in which said pH is adjusted in real time.

37. A method of chloride extraction from contaminated reinforced concrete comprising, removing said chloride using an electrolyte comprised of a conductive gel having at least one bonding agent therein.

38. The method of claim 37 in which said conductive gel is comprised of an ionically conductive acrylic.

39. The method of claim 38 in which said ionically conductive acrylic is a modified ionically conductive acrylic.

40. A method of chloride extraction from contaminated reinforced concrete comprising, removing said chloride using an electrolyte comprised of a pH booster.

41. The method of claim 40 in which said electrolyte is comprised of an ionically conductive acrylic.

42. The method of claim 41 in which said electrolyte further comprises a lithium salt.

* * * * *